United States Patent [19]

Schlanger

[11] Patent Number: 5,707,114
[45] Date of Patent: Jan. 13, 1998

[54] VEHICLE WHEEL

[76] Inventor: Raphael Schlanger, 128 Hulda Hill Rd., Wilton, Conn. 06897

[21] Appl. No.: 511,958

[22] Filed: Aug. 7, 1995

Related U.S. Application Data

[63] Continuation-in-part of Ser. No. 134,660, Oct. 12, 1993, Pat. No. 5,452,945.

[51] Int. Cl.$^6$ .................................................. B60B 1/14
[52] U.S. Cl. ............................................. 301/58; 301/64.1
[58] Field of Search .................................. 301/54, 55, 58, 301/59, 64.1, 64.2, 67, 68, 73, 79, 104

[56] References Cited

U.S. PATENT DOCUMENTS

| | | | |
|---|---|---|---|
| 734,731 | 7/1903 | Miller | 301/54 |
| 2,104,112 | 1/1938 | Barratt | 301/64.1 |
| 3,008,770 | 11/1961 | Mueller | 301/54 |
| 3,410,605 | 11/1968 | Mayrath | 301/64.1 |
| 4,181,365 | 1/1980 | Kawaguchi et al. | 301/64.2 X |

FOREIGN PATENT DOCUMENTS 9712  4/1897  United Kingdom ................. 301/64.1

*Primary Examiner*—Russell D. Stormer
*Attorney, Agent, or Firm*—Bachman & LaPointe, P.C.

[57] ABSTRACT

The wheel includes an annular rim, a central hub and a plurality of spoke portions running between the rim and hub, with each spoke having a width to thickness ratio of at least 2:1, with the spoke portions having an inside portion in fixed relationship to the hub and an outside portion in fixed relationship to the rim with the spoke portions extending radially outwardly between the hub and rim. An encircling member is provided affixed to at least one of the inside and outside spoke portions defining an enclosed, continuous hollow annulus and including fasteners within the hollow annulus for affixing the spoke portions to said circular member.

49 Claims, 12 Drawing Sheets

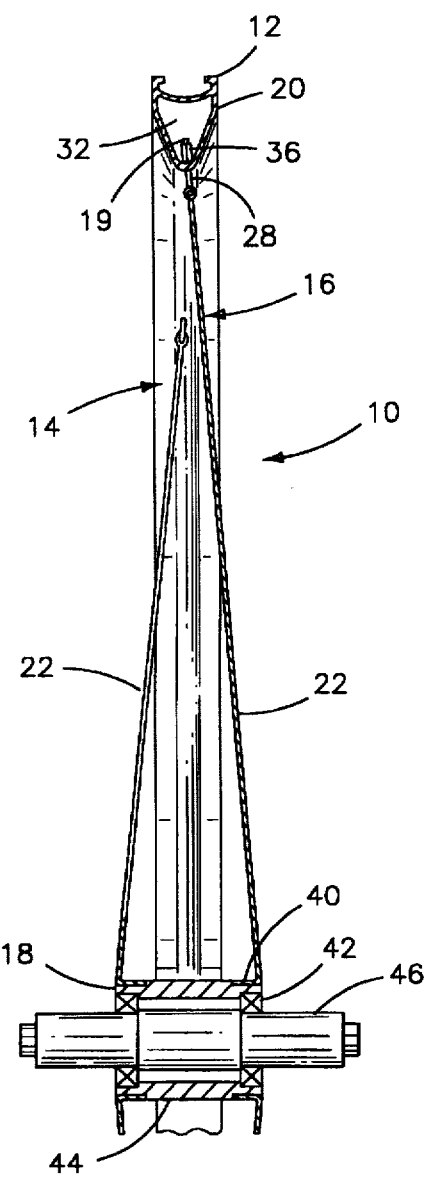
FIG-2
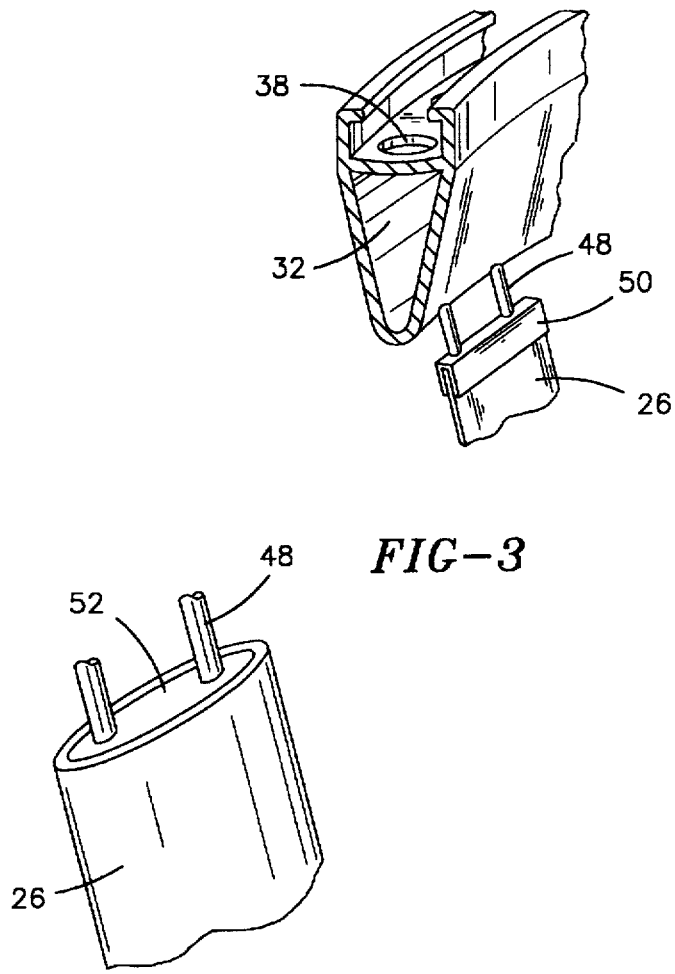
FIG-3
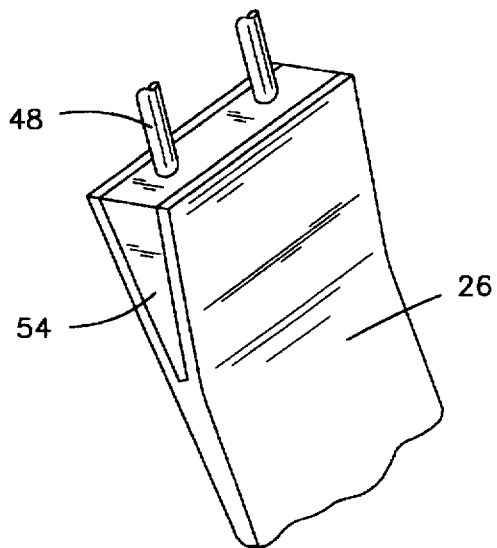
FIG-4
FIG-5

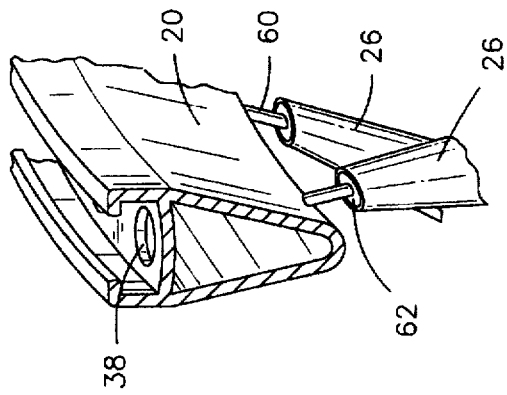
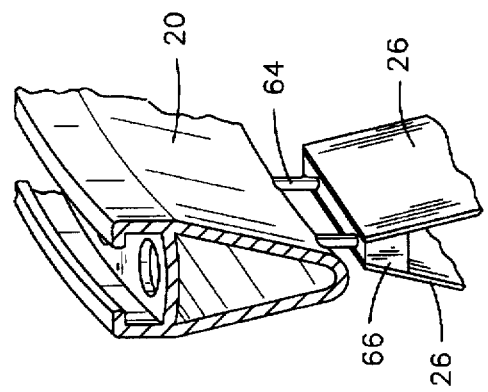
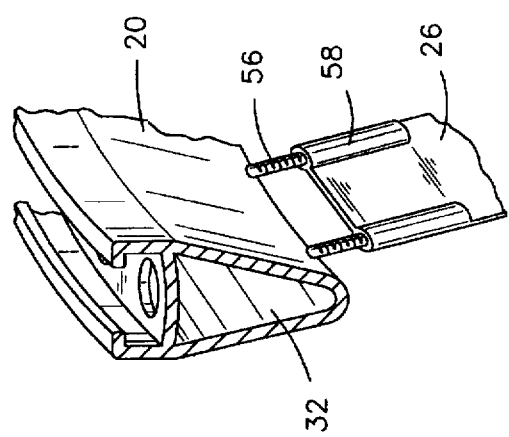
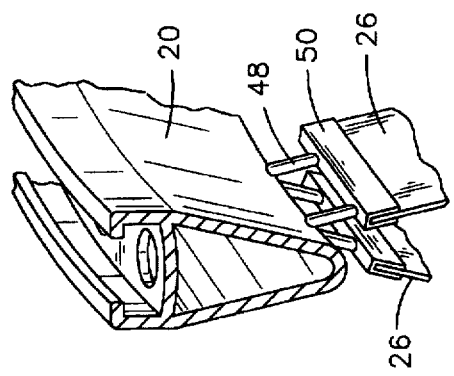
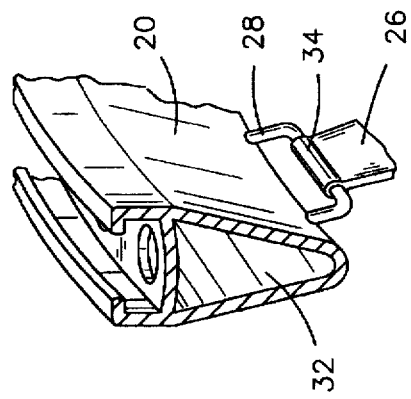

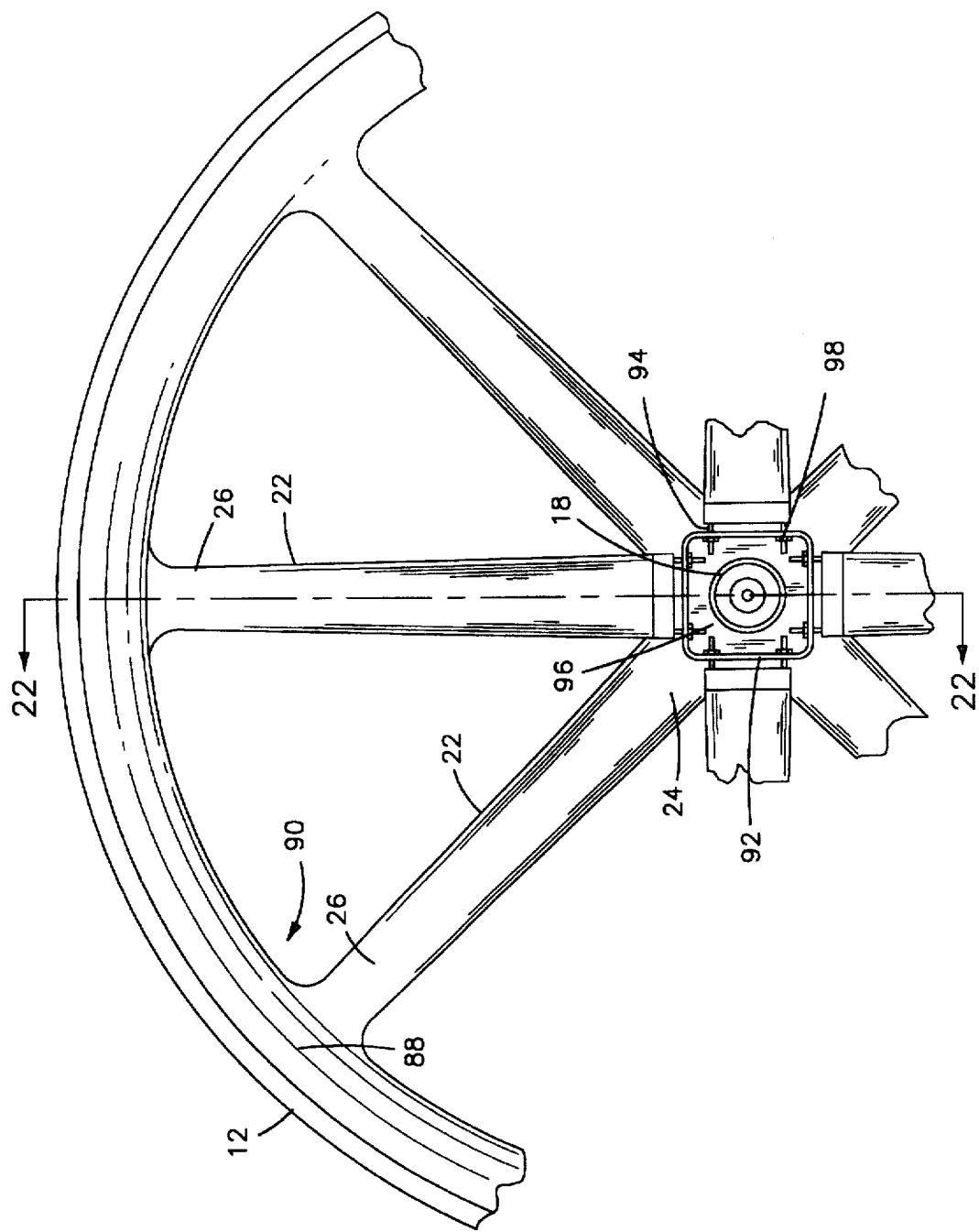

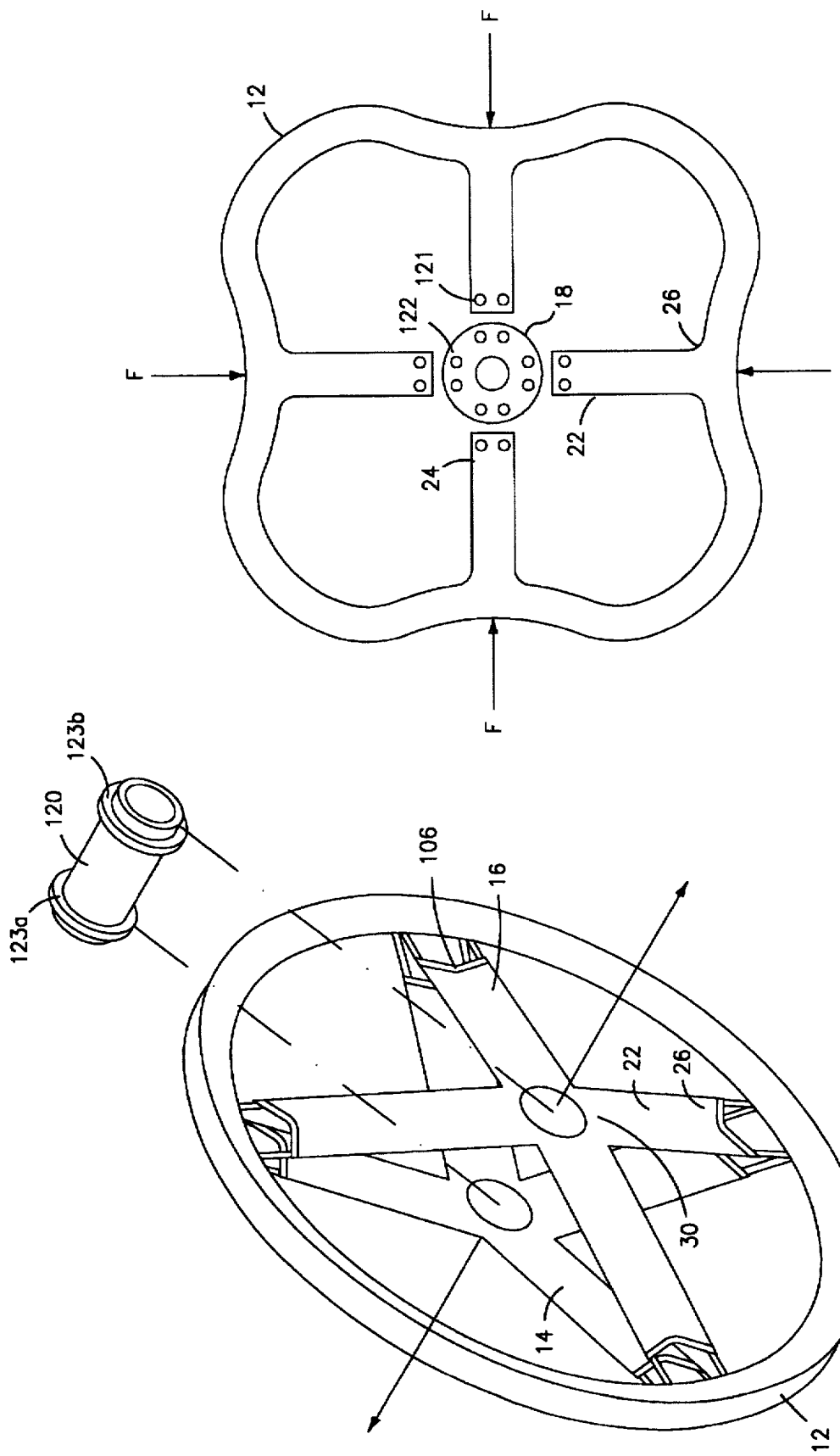

VEHICLE WHEEL

CROSS-REFERENCE TO RELATED APPLICATION

This application is a Continuation-In-Part of U.S. patent application Ser. No. 08/134,660, filed Oct. 12, 1993, and now U.S. Pat. No. 5,452,945.

BACKGROUND OF THE INVENTION

This invention relates to a vehicle wheel and especially to a bicycle wheel having a rim section, a plurality of spoke sections and a hub section.

In recent years, participation in competitive cycling has increased dramatically and has created a demand for greater performance characteristics from cycling equipment. It is generally acknowledged that reduced aerodynamic drag, lower weight, increased rider comfort, lower maintenance and reduced cost are goals to consider when attempting to enhance the performance of bicycle equipment.

Conventional bicycle wheels are typically constructed using 28 or more individual wire spokes. Each of these spokes must continually break the wind as the wheel rotates, creating aerodynamic drag. An attempt to overcome some of this aerodynamic drag has been to construct the bicycle wheel as a solid disc. Although these disc wheels reduce the aerodynamic drag, rider stability and safety are significantly compromised. If prevailing wind patterns have any component perpendicular to the riders direction of travel, as is most often the case, the disc wheel acts as a sail resulting in a potentially dangerous instability problem.

More recently, several manufacturers have introduced one-piece spoke wheels constructed from fiber reinforced plastic. These wheels attempt to reduce aerodynamic drag by reducing the number of individual spokes to three or five. However, in an effort to maintain lateral rigidity, these wheels utilize additional material in construction and weigh significantly more than a conventional wheel of comparable size. Additionally, the manufacturing processes required to produce these plastic spoke wheels are quite complex.

Fabrication involves careful wrapping of fiber reinforcement cloth around a foam armature or plastic bladder, placing this assembly within a mold, together with uncured resin, and applying heat and pressure to the mold to cure the resin. This process is very labor intensive and requires highly skilled production personnel. Also, the disc type wheels and the plastic spoke wheels have been described as lacking the shock absorption and resiliency of conventional wheels, resulting in a more uncomfortable ride. These disc type wheels and plastic spoke wheels act to support a load on the axle through compression of the spoke or disc sector between the hub and the ground resulting in excessive rigidity. Conventional wheels support this load through tension of the spokes above the hub. It is this tension loading which gives the conventional wheel its resilient feel.

U.S. Pat. No. 5,104,199 represents an improvement over the foregoing and describes a vehicle wheel including an annular rim, a central hub, a plurality of spoke portions running between the rim and hub, and two wheel portions integrally joined to each other and including the spoke portions. It is desirable to provide a still further improvement over this construction.

It is particularly desirable to provide an improved vehicle wheel, especially a bicycle wheel, that can be manufactured at a reasonable cost through a configuration that leads itself to simple manufacturing processes, fewer component parts and minimal raw material. It would be highly advantageous to provide such a bicycle wheel with low aerodynamic drag and limiting the number of individual spokes and minimizing the spoke frontal area in the direction of rotation.

It would be particularly advantageous to provide a bicycle wheel as aforesaid which enables one to utilize spokes that are predetermined along their longitudinal axis to create a static structure with tension elements (spokes) and compression elements (rim and hub shell).

It is a further objective to enable one to provide a vehicle wheel as aforesaid that is light weight by utilizing light weight, high strength materials and by reducing the volume of material required to produce a structurally sound product.

Further objects and advantages of the present invention will appear hereinbelow.

SUMMARY OF THE INVENTION

The present invention provides a spoked wheel achieving the objects and advantages set forth hereinabove.

In one embodiment, the spoked wheel comprises an annular rim, a central hub, and a plurality of spokes running between the rim and hub. Each spoke has a width to thickness ratio of at least 2:1, wherein the spokes have spoke portions including an inside spoke portion in fixed relationship to the hub and an outside spoke portion in fixed relationship to the rim. The spokes extend radially outwardly between the hub and rim. An encircling member is affixed to at least one of the inside and outside spoke portions and is included with at least one of the annular rim and the central hub. The encircling member defines a continuous hollow annulus. A fastener is provided including two leg members extending in substantially the same direction. The leg members are attached via an intermediate portion substantially traversing the direction and the fastener extends from at least one of the inside spoke portion and the outside spoke portion of at least one of the plurality of spokes and into the hollow annulus. The fastener is attached to the at least one of the plurality of spokes and the leg members are directed toward the encircling member.

In another embodiment, the spoked wheel comprises an annular rim having an inner diameter, a central hub, and a plurality of spokes running between the rim and hub. Each spoke has a width to thickness ratio of at least 2:1, wherein the spokes have spoke portions including an inside spoke portion in fixed relationship to the hub and an outside spoke portion in fixed relationship to the rim. The spokes extend radially outwardly between the hub and rim and at least two of the spokes are integrally connected, forming a singular member extending substantially across the inner diameter of the rim. An encircling member is affixed to at least one of the inside and outside spoke portions and is included with at least one of the annular rim and the central hub. The encircling member defines a continuous hollow annulus. Means adjacent the hollow annulus are included for affixing the spokes to the encircling member.

In still another embodiment, the spoked wheel comprises an annular rim and, a plurality of spokes running between the rim and a central area. Each spoke has a width to thickness ratio of at least 2:1, wherein the spokes have spoke portions including an inside spoke portion in fixed relationship to the central area and an outside spoke portion in fixed relationship to the rim. The spokes extend radially outwardly between the central area and rim wherein the plurality of spokes are arranged to form a first and a second wheel half. An encircling member is affixed to the outside spoke portions and included with the annular rim. The encircling member defines a continuous hollow annulus. Fastening means are included adjacent the hollow annulus for affixing the spokes to the encircling member. Means for tensioning the spokes may also be provided and positioned between the first and second wheel halves.

A process for tensioning spokes of a spoked wheel include the steps of providing a rim having an equilibrium position and a hub to which the spokes are adapted to be attached, wherein the spokes have inside spoke portions and outside spoke portions; attaching one of the outside spoke portions to the rim and the inside spoke portions to the hub; and deforming the rim and connecting one of the inside spoke portions to the hub and the outside spoke portions to the rim, wherein the spokes are adapted to be in tension after the step of deforming the rim and connecting the spokes to one of the hub and the rim and the rim returns to the equilibrium position.

Further features of the present invention will appear hereinbelow.

BRIEF DESCRIPTION OF THE DRAWINGS

The present invention will be more readily understandable from the accompanying drawings.

FIG. 2 is a cross-sectional view taken along line 2—2 of FIG. 1;

FIG. 3 is a partial perspective view, of an alternate embodiment of the present invention;

FIGS. 4 and 5 are partial perspective views of alternate spoke portion constructions;

FIGS. 6–16 are partial perspective views of alternate embodiments of the present invention;

FIG. 21 is a partial side view of a further embodiment of the present invention.

FIG. 24 shows an additional mechanism and process for tensioning the spokes of the present invention.

FIGS. 25A and 25B shows another process for tensioning the spokes of the present invention.

DETAILED DESCRIPTION OF PREFERRED EMBODIMENTS

Figure 1:
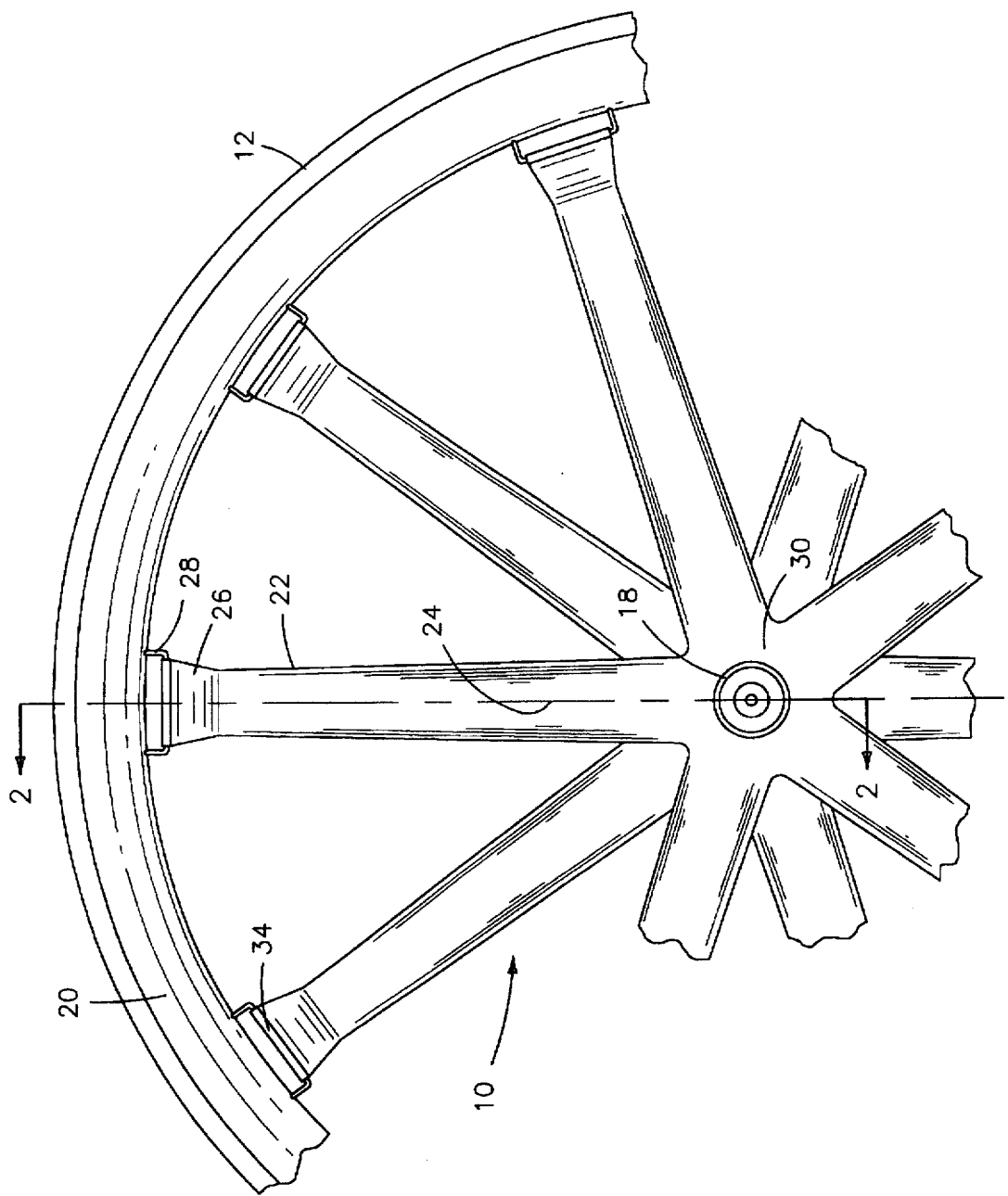
FIG. 1 is a partial front view of the preferred embodiment of the wheel construction.

Referring to the drawings, a preferred embodiment is shown in FIGS. 1–2. Referring to FIGS. 1 and 2, wheel 10 includes an annular rim or rim hoop 12 sandwiched between the left wheel half 14 and the right wheel half 16 and extending outwardly therefrom. The central hub or hub shell 18 is of a generally cylindrical configuration and is connected around its perimeter at one end to the left wheel half 14 and at the other end to the right wheel half 16. The wheel 10 also includes an encircling member 20, preferably a circular member, supporting rim 12 and affixed to spokes 22.

Spokes 22 have an inside spoke portion 24 thereof and an outside spoke portion 26 thereof. The outside spoke portion 26 is affixed to encircling member 20 via U-shaped fasteners 28 in a manner which will be described below.

The inside spoke portions are joined together at the hub 18 to create a common spoke spider 30. The spokes are connected to the circular member and rim in an alternating fashion. As indicated above, each outside spoke portion 26 is connected to encircling or circular member 20 via U-shaped fasteners 28 which are threaded at both ends. Encircling or circular member 20 defines an enclosed, continuous hollow annulus 32 for supporting hoop stress. The spoke material is connected to the U-shaped fasteners as by wrapping around the center portion of the U-shaped fastener at the outward extremity 34 of spoke 22 (see FIG. 6), and the threaded ends 19 of the U-shaped fasteners 28 extend into the hollow annulus 32 and are affixed to holding means therein, as nuts 36. The nuts may be passed into hollow annulus 32 via access holes 38 (see FIG. 3). Spoke tension can now be adjusted by tightening or loosening these nuts in a manner similar to the spoke adjustment of a conventional wheel.

The spoke spider 30 is fixed to hub 18 by any convenient means as by turned flange 40 which is bonded to hub 18.

The hub 18 includes bearings 42, hub shell 44 and axle 46 passing therethrough.

The multiple anchor points of the spoke end are beneficial in several ways. Since the spokes contribute to aerodynamic drag, it is beneficial to use fewer spokes. This creates greater stress on the individual spokes. Multiple fasteners can handle more stress than a single fastener and also serve to distribute the load over a wider portion of the circular member and rim, creating less stress concentration in these components. Also, anchoring these wide spokes at their outer corners will aid in transmitting torque between the hub and rim which is particularly important with a rear wheel.

FIGS. 3–7 show alternate methods of joining the flat spoke to the circular member. All of these use the beneficial multiple anchor points.

FIG. 3 uses at least two threaded fasteners 48 connected to spoke outside portion 26 via metal cover 50 which is bonded to outside spoke portion 26. The threaded ends of fasteners 48 extend into hollow annulus 32 and are affixed to nuts or the like in the same way as in FIG. 2.

FIGS. 4 and 5 show threaded fasteners 48 affixed to inserts 52 and 54, respectively, which are bonded inside outside spoke portion 26.

FIG. 6 shows a detail of the embodiment of FIGS. 1 and 2 wherein U-shaped fastener 28 has two leg members with threaded ends (not shown in FIG. 6) which extend into the hollow annulus 32 of circular member 20. Outward extremity 34 of outside spoke portion 26 is wrapped around the center or intermediate portion of the U-shaped fastener, which intermediate portion connects the two leg members.

FIG. 7 shows two spaced threaded fasteners 56 extending from enlarged portion 58 of outside spoke portion 26 into hollow annulus 32 to be affixed therein as in other embodiments.

FIG. 8 shows an alternate embodiment wherein a single threaded fastener 60 is affixed to each outside spoke portion 26 via inserts 62 in a manner similar to FIGS. 4–5; however, there is only one threaded fastener for each spoke end connection instead of two.

FIGS. 9 and 10 show an opposed spoke configuration instead of an alternating configuration as in FIGS. 1 and 2.

FIG. 9 shows each outside spoke portion 26 with two threaded fasteners 48 connected thereto via metal cover 50 affixed to the spoke portion as in FIG. 3. FIG. 10 shows two threaded fasteners connected to outside spoke portion 26 via a single insert 66 affixed to two opposed outside spoke portions 26.

Figure 13:
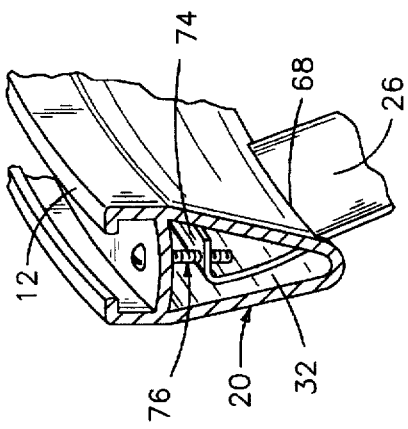
Figure 12:
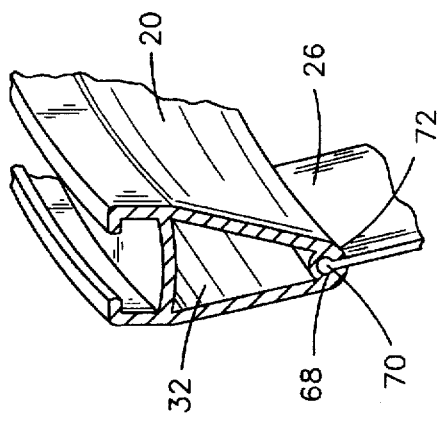
Figure 11:
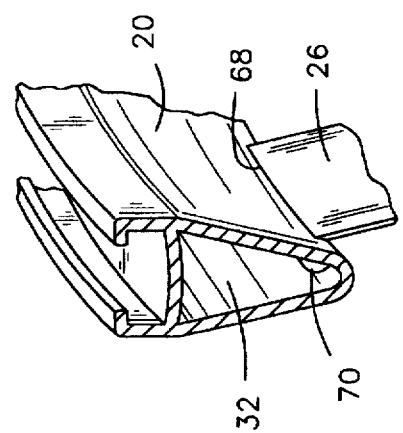

FIGS. 11–13 show a spoke connection wherein the outside spoke portions 26 pass through an elongated slot 68 in circular member 20. The configurations shown in FIGS. 11–13 could be used in either an alternating or opposed spoke configuration. FIG. 11 shows outside spoke portion 26 including an enlarged end 70 which is passed through slot 68 and seated within annulus 32. In FIG. 12, the enlarged end 70 is seated in continuous slot 72 which is formed from encircling or circular member 20 adjacent outside spoke portion 26. FIG. 13 anchors outside spoke portion 26 within annulus 32 via flange 74 of outside spoke portion 26 affixed to rim 12 by threaded fastener 76 which may easily be used for spoke tension adjustment.

Figure 16:
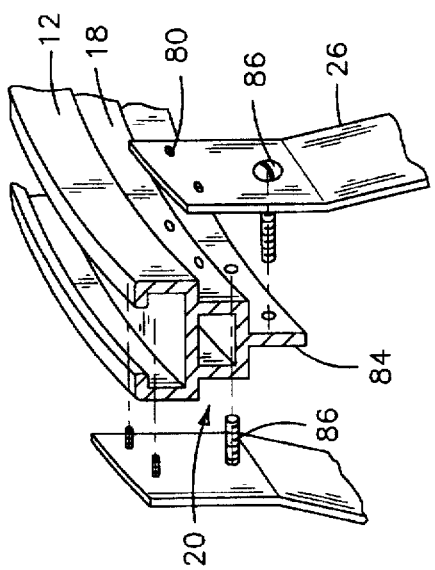
Figure 15:
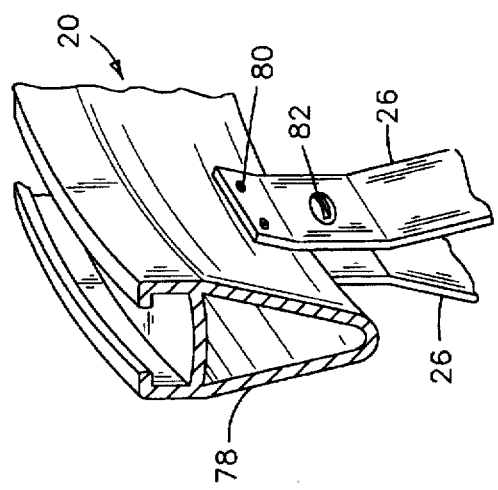
Figure 14:
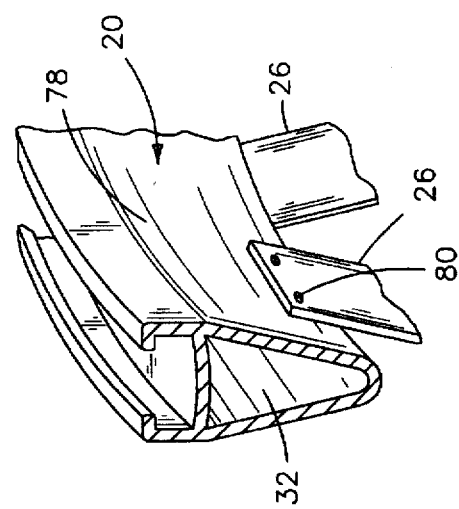

FIGS. 14–16 show spoke connections where the outside spoke portions 26 are fastened to the side wall 78 of circular member 20. These embodiments could also be used in opposed or alternating spoke arrangements.

FIG. 14 shows wide spoke outside spoke portion 26 fastened to one side of circular member side wall 78 via fasteners 80 extending into annulus 32, with the spokes extending to the axially opposite side of the hub. This arrangement would only be possible in an alternating spoke configuration. The spoke could also connect to a tab or flange portion of the circular member, if desired.

FIG. 15 shows an opposed spoke configuration where each outside spoke portion 26 is connected to its respective side of the hub. Each outside spoke portion 26 is first affixed to circular member side wall 78 via fasteners 80 as in FIG. 14. In addition, threaded fastener 82 is provided extending between two opposed outside spoke portions anchoring them together at a point inboard from the spoke-circular member anchoring point. This fastener 82 is aligned in a generally axial direction and may be used as a means to create or adjust spoke tension.

FIG. 16 is similar to FIG. 15 except that encircling or circular member 20 includes a depending flange 84 for fasteners 86 inboard of the outside spoke portion-circular member anchoring point which can be used in the same manner as fastener 82 in FIG. 15.

Figure 17:
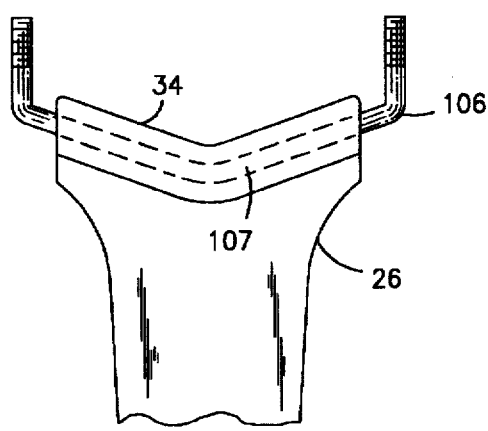

FIG. 17 shows another spoke fastener 106, similar to the fastener of FIG. 6, but having a substantially V-shape. V-shaped fastener 106 has two leg members with threaded ends which extend into the hollow annulus 32 of encircling member 20, as shown in FIG. 6. Outward extremity 34 of outside spoke portion 26 is wrapped around the center or intermediate portion 107 of V-shaped fastener 106. In accordance with this design, stresses are distributed further along the full width of fastener 106 instead of placing high stress concentrations on the areas of the fastener adjacent the outer edges of outer extremity 34. Accordingly, a stronger fastener is provided.

Figure 18:
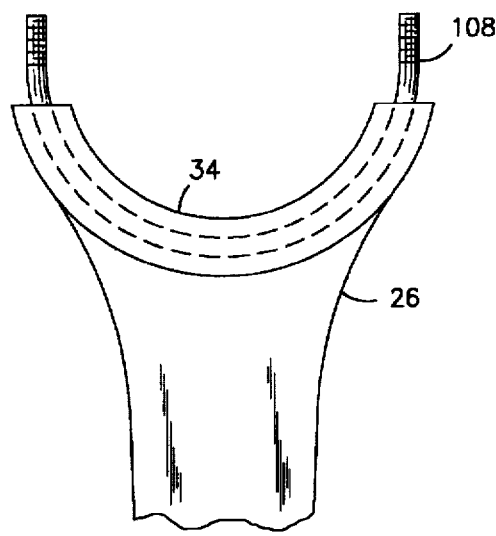

As an alternative to the V-shaped fastener shown in FIG. 17, a U-shaped, curved or substantially semi-circular or semi-oval fastener 108, as shown in FIG. 18, can be used which again has outward extremity 34 of outside spoke portion 26 wrapped therearound. In this design, forces are even further distributed along the full width of fastener 108, in comparison to fastener 106.

Figure 19:
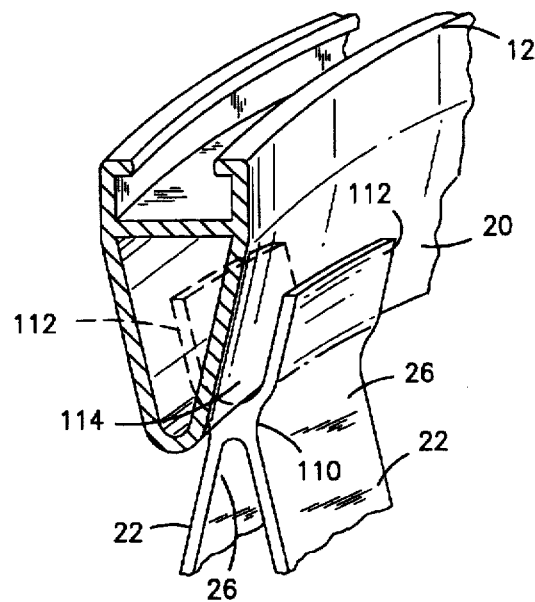
FIGS. 17–20 show further alternative embodiments of fasteners of the present invention.

Referring now to FIG. 19 there is shown another embodiment of a manner in which spokes 22 are fastened to encircling member 20 of rim 12. In this embodiment, pairs of opposing spokes 22 are joined at their outside spoke portions 26 forming joint 110 adapted to be positioned against encircling member 20. At joint 110 of spokes 22, angled ends 112 extend outwardly preferably in a shape conforming with encircling member 20, a U- or V-shape and forming a U- or V-shaped surface 114, wherein surface 114. Accordingly, surface 114 conforms with and engages encircling member 20 and is preferably adhered via glue or otherwise fastened to the outer wall forming encircling member 20. Fasteners such as those described in FIGS. 3–18 are preferably used for attaching the inside spoke portions to hub 18, and accordingly, the descriptions of the fasteners are hereby incorporated for use with this embodiment. A similar arrangement may be used for engaging an inside encircling member as shown in FIG. 21.

Figure 20:
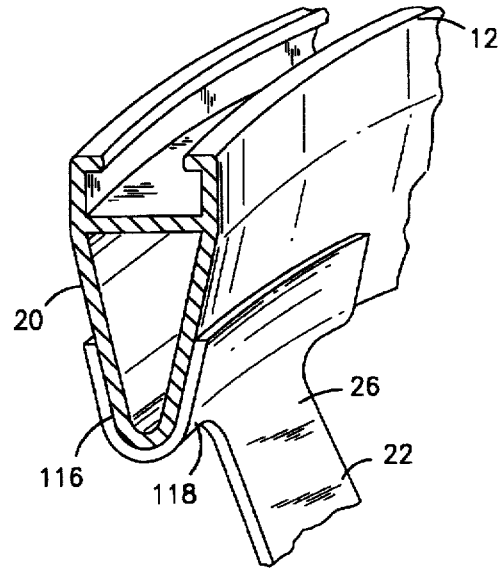

Another embodiment of a fastener or fastening mechanism for spokes 22 is shown in FIG. 20, wherein spokes 22 are integrally joined at their outside spoke portions 26 via a secondary encircling member 118, having a preferably U- or V-shaped surface 116, wherein secondary encircling member 118 preferably conforms to encircling member 20 and is circular in shape. Secondary encircling member 118 is attached to rim 12 preferably by adhering the same thereto although other means such as rivets or the like may be used. Fasteners such as those described in FIGS. 3–19 are preferably used for attaching the inside spoke portions to hub 18, and accordingly, the descriptions of the fasteners are hereby incorporated for use with this embodiment.

Figure 22:
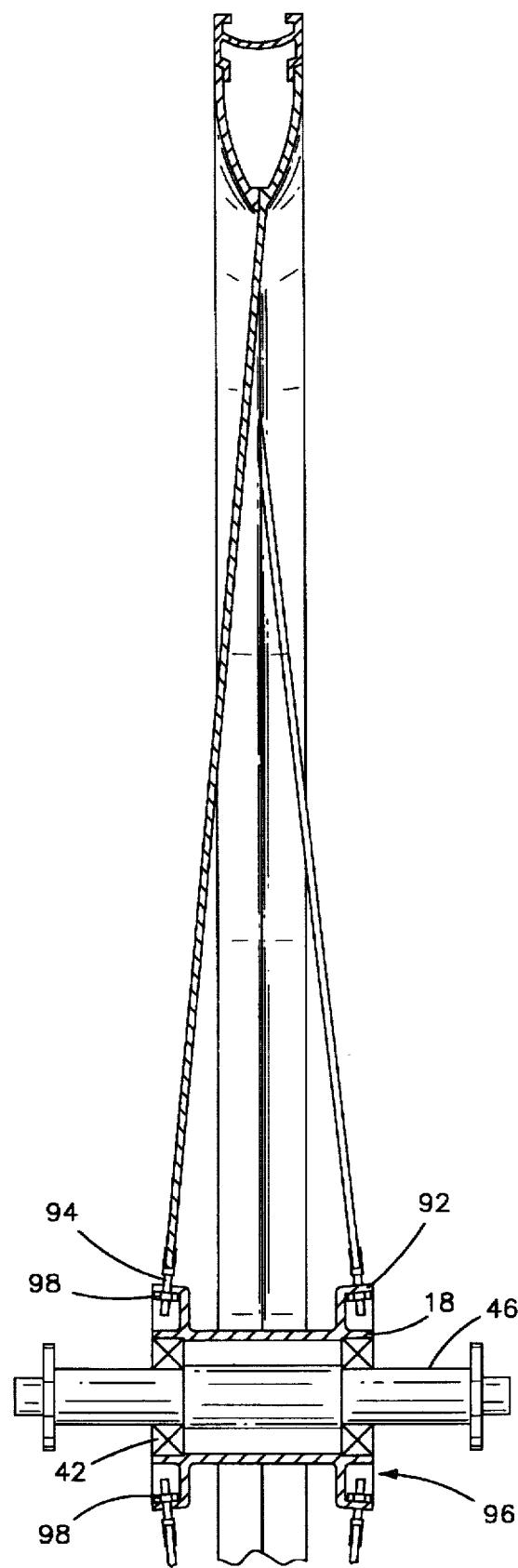
FIG. 22 is a sectional view along lines 22—22 of FIG. 21.

FIGS. 21–22 show an alternate embodiment wherein outside spoke portions 26 of spokes 22 are integral with outside circular member 88 and/or if desired integral with rim 12, forming an outside spoke spider 90. Inside spoke portions 24 are affixed to inside encircling member 92 surrounding hub 18 and affixed thereto as by multiple threaded fasteners 94 extending from the inside spoke portions 24 to inside encircling member 92 and into inside hollow annulus 96 formed by inside encircling member 92. Fixing means as nuts 98 engage fasteners 94 within annulus 96 in a manner after the other embodiments. This arrangement permits easy adjustment of spoke tension and a firm spoke connection.

While not shown for each type of fastener, it should be understood that each of the fasteners described for all of the figures can be used for attaching the spokes to the inside encircling member 92 as well as encircling member 20. Inside encircling member may be rectangularly shaped as shown in FIG. 22 or circular in shape, and include features as described above for encircling member 20, for example, slots, required for receiving or engaging the various fasteners.

Figure 23:
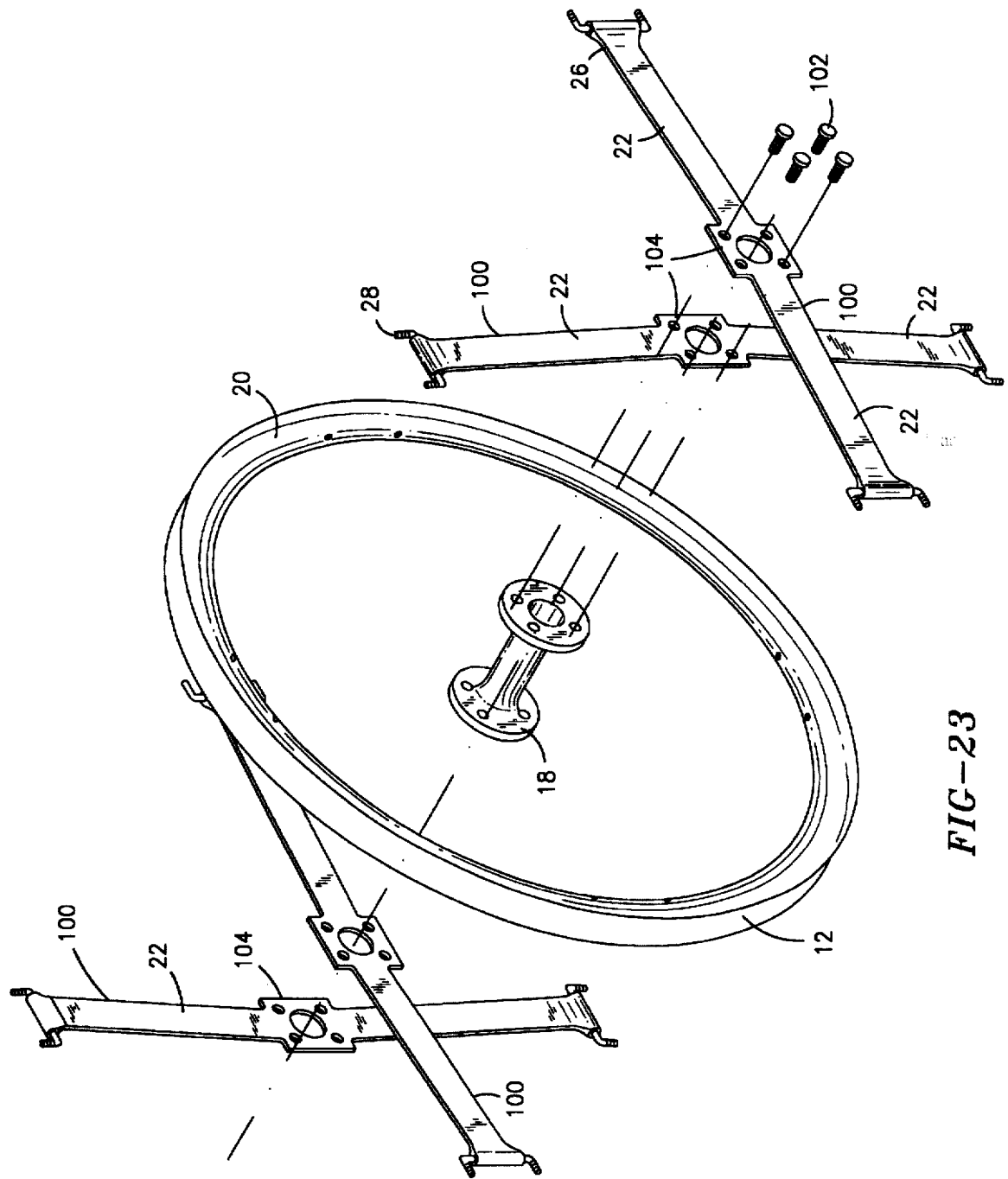
FIG. 23 is an exploded view of a further embodiment of the present invention.

FIG. 23 shows another alternative embodiment of the wheel of the present invention wherein the spokes 22 are arranged in spoke pairs 100, which are separate members that are not integrally joined at an inner or outer spoke spider to other spoke pairs. Each of spoke pairs 100 is attached to hub 18 via fasteners 102 or the like, which extend through a centrally located, preferably enlarged intermediate portion 104 which is adapted to be fastened against the end of hub 18. Two of spokes 22 are preferably integrally attached to enlarged intermediate portion 104 to form the spoke pair 100. Each spoke pair 100 is preferably bowed outwardly at enlarged intermediate portion 104, relative the attachment of outside spoke portion 26 of spokes 22 with encircling member 20 of rim 12 and extends across the inner diameter of encircling member 20. Each end or outside spoke portion 26 of each spoke 22, preferably includes a fastener of the variety shown in FIGS. 3–20 and as described in detail above, and accordingly the detailed description for these fasteners are incorporated herein for this embodiment.

In the specific embodiment shown, each of spokes 22 includes U-shaped fastener 28, shown in FIG. 6. Accordingly, two spoke pairs 100 are used on each side of rim 12 wherein spoke pairs 100 are attached in an overlapping manner to each end of hub 18 via fasteners 102. U-shaped fasteners 28 extend to encircling member 20. Again, while U-shaped fastener 28 is shown, any of the other fasteners described in detail above, can be used with this embodiment such as, e.g. a V-shaped fastener, and are hereby incorporated into the description of the FIG. 23 embodiment. While two spoke pairs 100, each with two spokes 22, are shown on each side of rim 12, any number of spoke pairs 100 with spokes 22 can be used, as rim 12 will accept, such as, for example, one and three spoke pairs, for providing less or additional rim support and stability as needed. In addition, spoke triplets can also be used having features similar to as described above for the spoke pairs and used in the same manner, such as, for example, with fasteners and the overlapping positioning but including three spokes integrally attached to and extending from a central enlarged portion.

FIG. 24 shows another embodiment of the present invention, similar to that shown in FIG. 2, with the addition of a supplemental, additional or alternative tensioning mechanism. The supplemental tensioning mechanism is a spacer 120 which when placed between the central area of the wheel halves, i.e. the inner spoke spiders 30 of the left wheel half 14 and right wheel half 16, provides additional tension to spokes 22. Tension is achieved since wheel halves 14 and 16 are spread axially apart and each of spokes 22 are extended and locked in the extended position. That is, by inserting spacer or insert 120 between the wheel halves, spokes 22 are locked into the tensioned position.

In one embodiment, the spacer may be cylindrical in shape and include flanges 123a and 123b for engaging the wheel halves 14 and 16, respectively. One example of spacer 120 and the central area or inner spoke spiders of wheel halves 14 and 16 are described in detail in U.S. Pat. No. 5,104,199, issued Apr. 14, 1992 to Raphael Schlanger, and such detailed description is hereby incorporated. The fasteners as described in detail with reference to FIGS. 3–20 are preferably used at the outside spoke portions 26 of spokes 22 for fastening spokes 22 to encircling member 20. The above detailed descriptions of these fasteners are hereby incorporated for use with this embodiment.

By using spacer 120 as an additional tensioning mechanism, the left and right wheel halves may be placed into initial tension wherein this tension may be then adjusted by way of the various fasteners and tensioning mechanisms disclosed herein at the outside spoke portions 26 of spokes 22. In the specific embodiment shown in FIG. 24, the V-shaped fasteners 106 as described below with reference to FIG. 17 are used.

Referring now to FIG. 25A, a process is shown for tensioning a vehicle wheel of the type shown in FIGS. 21 and 22 or at least for a vehicle wheel where no inside spoke spider is used and spokes 22 are individually connectable to inner encircling member 92, as shown in FIGS. 21 and 22, or hub 18, at their inside spoke portions 24. Accordingly, in this process the vehicle wheel to be tensioned include inside spoke portions 24 of each spoke which are individually connectable to hub 18 and outside spoke portions 26 of each spoke connected with rim 12.

In tensioning a vehicle wheel of this type, rim 12 may be deformed radially from an equilibrium position, i.e. the shape thereof without forces applied, toward hub 18. As indicated by the arrows, forces F are applied in the radial direction to rim 12 toward hub 18, preferably in 2, 3, 4 or more locations, an most preferably 4 locations. The forces F temporarily deform rim 12, as shown in an exaggerated manner in FIGS. 25A and 25B for clarity, deflecting spokes 22 and inside spoke portions 24 towards hub 18. Inside spoke portions 22 preferably include fastening means such as holes 121 which are adapted to align with holes 122 on hub 18 for the receipt of fasteners for fastening inside spoke portions 24 to the hub 18.

The wheel is preferably designed such that when holes 121 of the inside spoke portions 24 and the fastening holes 122 in the hub 18 are in alignment, spokes 22 are in the desired tension. Accordingly, once the holes 121 of the inside spoke portions 24 are in alignment with the fastening holes 122 of hub 18, fasteners are used to connect the spokes 22 to the hub 18 and forces F are released, returning the rim substantially to its equilibrium position. For this wheel, the outside spoke portions may also be attached to rim 12 via any one of the fasteners discussed above in FIGS. 3–20 and be connected by outside spoke spider 90, as shown in FIGS. 21 and 22. In addition, it is also contemplated to use the fasteners or fastening methods shown in FIGS. 3–20 to attach spokes 22 to hub 18 when spokes 22 are forced radially inward via forces F. The description above for the various fasteners of FIGS. 3–20 are hereby incorporated into this embodiment for use with the tensioning process.

Figure 25B:
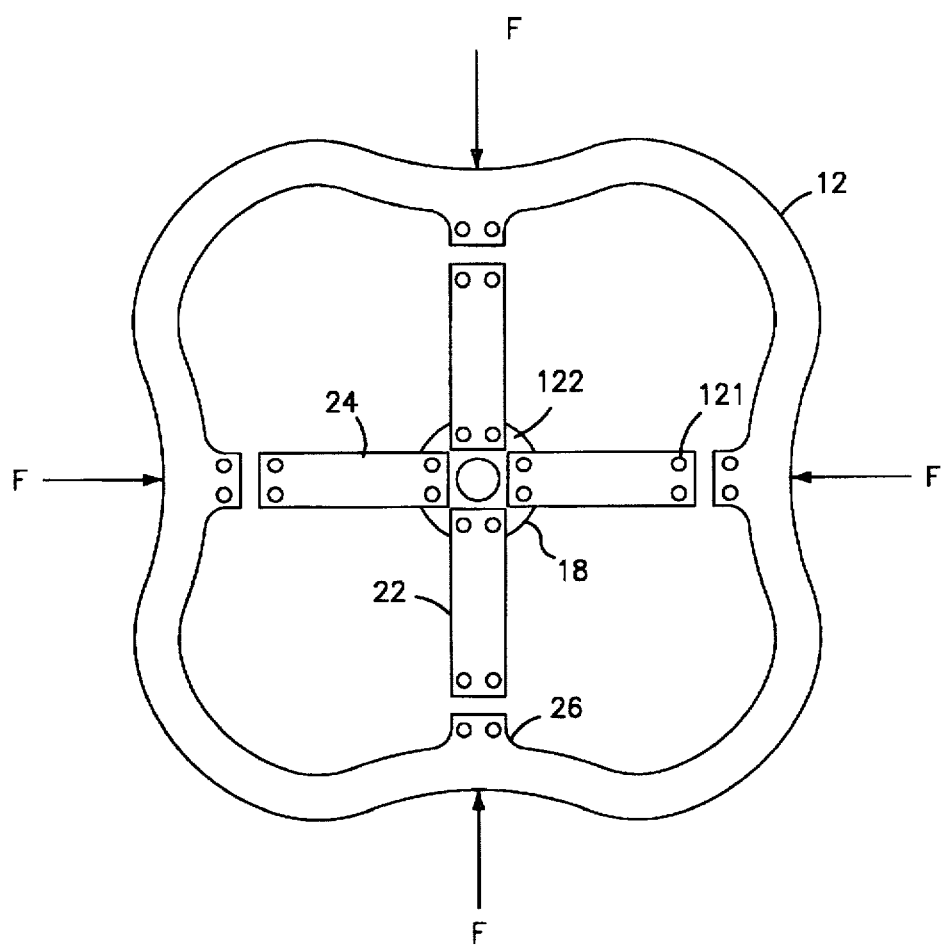

As an alternative to the above discussed process, spokes 22 may first be attached to hub 18 and unattached to rim 12, prior to deformation, as shown in FIG. 25B; the rim deformed as discussed above and as shown toward hub 18; and spokes 22 attached at outside spoke portions 26, under rim deformation, to rim 12. In either case, a tensioned vehicle wheel is accordingly achieved when spokes 22 are attached during deformation to rim 12 or hub 18, and the external deformation forces F are removed.

Figure 26:
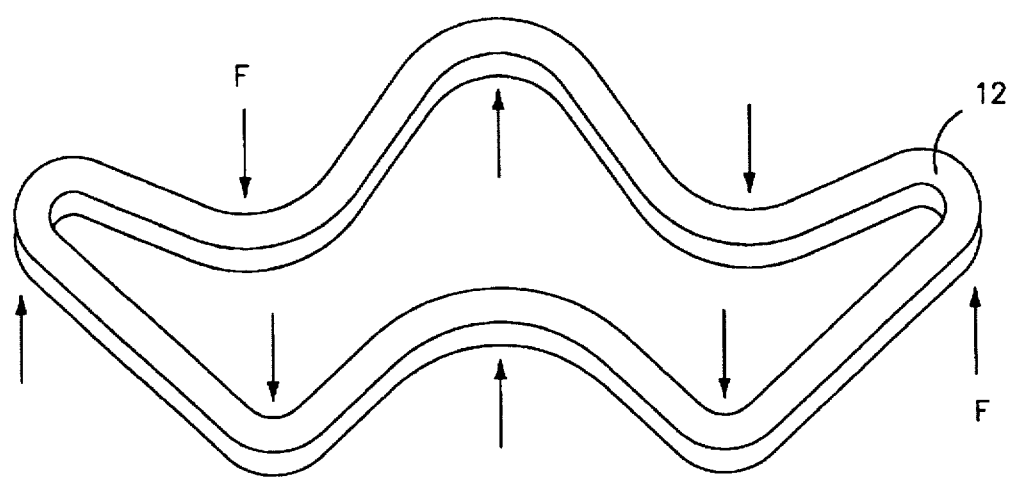
FIG. 26 shows a simplified perspective view of a process for tension alternating spokes of the king shown in FIG. 14.

For alternating spoke arrangements such as that shown in FIG. 14, another process can be used for tensioning the spokes. Referring to FIG. 26 and sequentially to FIGS. 27A–27D, in this process, rim 12 with spokes 22 attached thereto and not yet to hub 18, is deformed axially, as shown in FIGS. 26 and 27B, by forces F represented by the arrows applied at a plurality locations at which spokes 22 are attached to rim 12.

Figure 27A:
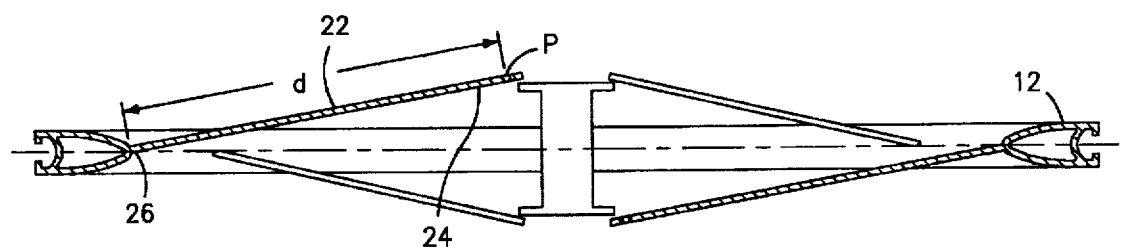
FIGS. 27A–27D shows a sequence of steps for the process of FIG. 26 for tensioning spokes.
Figure 27B:
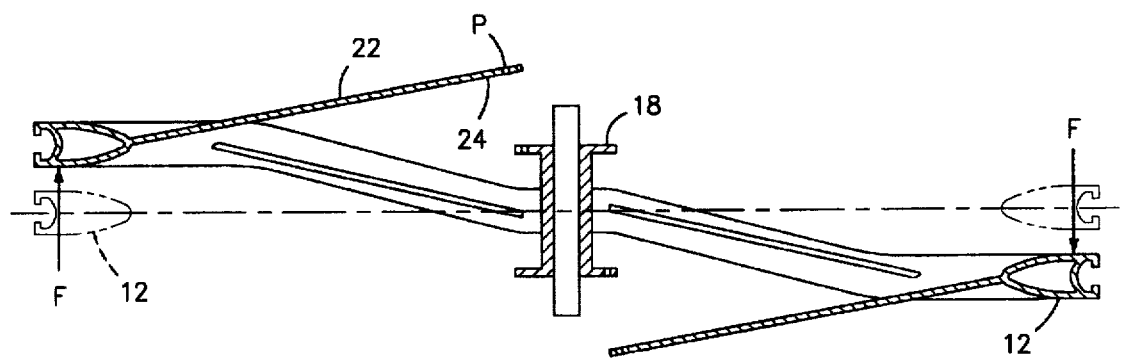
Figure 27C:
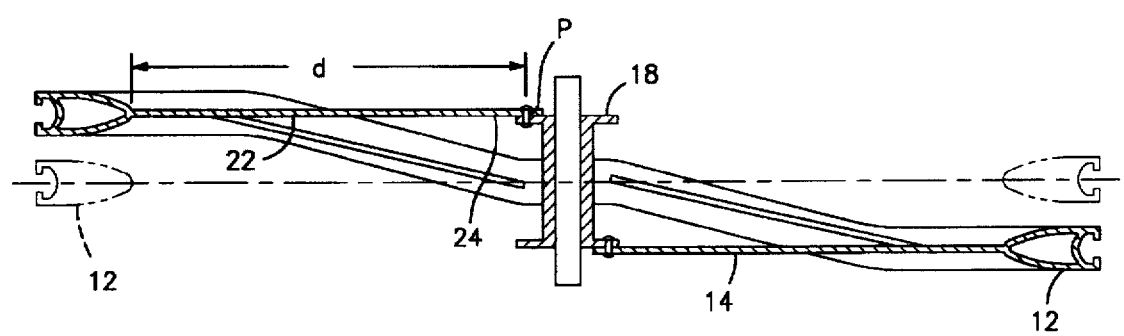

Rim 12 is secured at several points and positioned to encircle hub 18 while hub 18 is also axially secured, as shown in FIGS. 27A and 27B. Axial forces or loads F are applied to rim 12 at spaced apart locations, on the rim 12 away from points of securement, preferably substantially simultaneously and in balanced locations, as shown in FIGS. 26 and 27B. The centerline or plane of rim 12 is accordingly moved in opposite directions along with at least one pair of spokes arranged in the alternating arrangement, at each location, as shown in FIG. 14, toward the plane of the ends of hub 18. The phantom rim indicates the non-deflected position of rim 12. In this embodiment, at an equilibrium position, spokes 22 do not extend in the plane of rim 12. Relative the ends of hub 18 to which the spokes were deflected, the outer spoke at each location is deflected, preferably substantially simultaneously, toward the hub end until it extends substantially in the plane of an end thereof. Spokes 22 which are extending horizontally are connected while in the horizontal position to the hub end to which it was deflected, as shown in FIG. 27C.

Figure 27D:
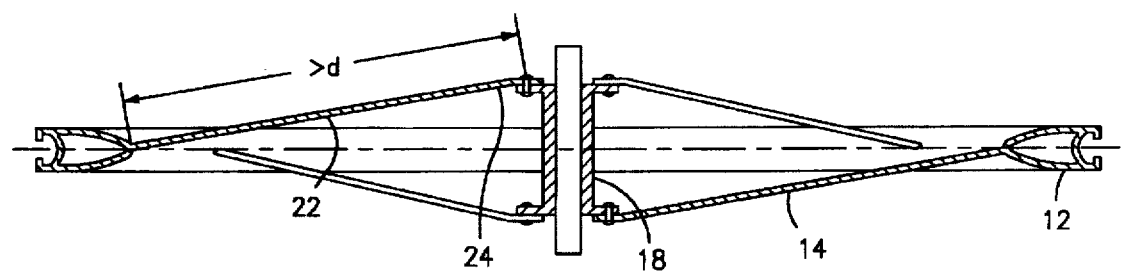

The loads or forces F are released and rim 12 returns to its equilibrium position under tension, as shown in FIG. 27D. Tension is achieved since, in the non-tensioned state as shown in FIG. 27A, point of connection P is positioned at distance d on spoke 22 from outside spoke portion 26 such that spoke 22 can not be connected to hub 18 at point P without the application of axial force F. Upon moving spoke 22 to the planar position of the end of hub 18, as shown in FIG. 27C, the positioning of point P at distance d is sufficient to achieve connection of spoke 22 with hub 18. In order for rim 12 to return to the equilibrium position of FIG. 27A, however, spoke 22 must stretch to distance >d, placing spoke 22 under tension.

As an alternative to the above discussed process, spokes 22 may first be attached to hub 18 and unattached to rim 12, prior to deformation; the rim deformed as discussed above; and spokes 22 attached at outside spoke portions 26, under rim deformation, by forcing spokes to rim 12 and releasing.

Accordingly, by deforming rim 12 in the manner shown, or in the alternative manner discussed, and attaching the spokes, upon release of the forces causing the deformation, rim 12 will return to its normal shape at equilibrium and with spokes 22 placed under tension.

Figure 28A:
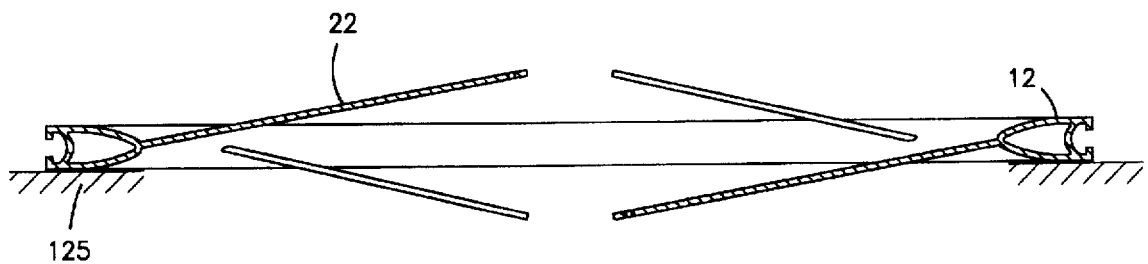
FIGS. 28A–28D shows a sequence of steps in a process for tensioning spokes of the opposed and alternating kind.
Figure 28B:
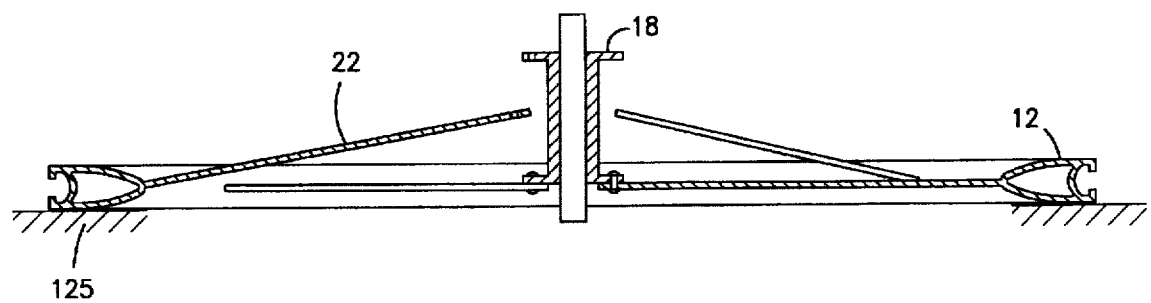

Referring now to FIGS. 28A–28D, a process for tensioning pairs of spokes arranged in both an opposed formation, as shown in FIG. 15, and in an alternating arrangement, as shown in FIG. 14, is shown. As shown in FIG. 28A, rim 12 with pairs of spokes extending inwardly therefrom is supported on support surface 125. As shown, the outside spoke portions 26 of spokes 22 lie out of the plane of rim 12 while in the equilibrium position. A hub 18 is positioned and supported to have one end thereof positioned substantially in the plane of the rim section centerline or plane, as shown in FIG. 28B. A spoke 22 from each pair and located substantially on the same side are forced into attachment with one end of hub 18, positioned in the plane of rim 12. This is achieved by bending the spokes into substantially the plane of rim 12, and attaching the spokes preferably via one of the fastener types shown in FIGS. 3–20, while rim 12 is held down on support 125.

Figure 28C:
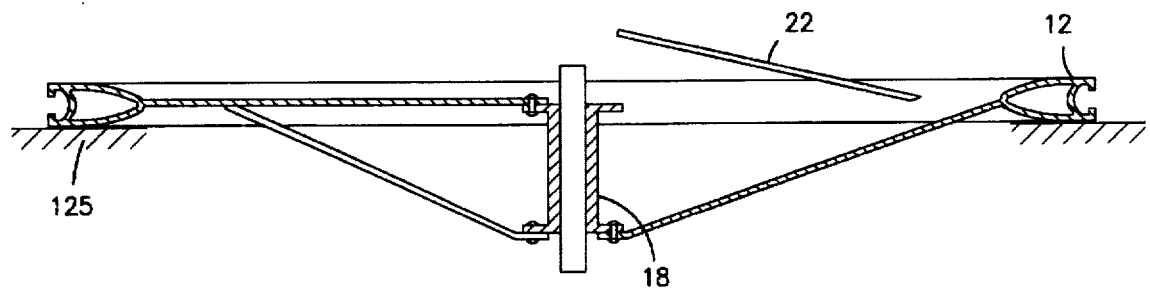
Figure 28D:
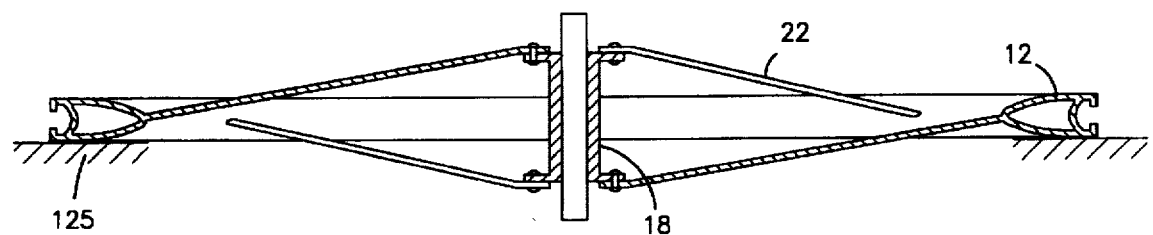

While rim 12 is supported, force or load F is applied to hub 18, as shown in FIG. 28C, moving the other end of hub 18 into the plane of the centerline of rim 12. For each pair of spokes 22, the unattached opposing or alternating spoke is moved into the plane of the centerline of rim 12 and attached to the other end of hub 18. In the meantime, the previously attached spoke is moved with hub 18 further away from the centerline of rim 12. As shown in FIG. 28D, the load or force F is then released and the spokes return to the equilibrium position, placing the spokes in tension. Tension is achieved in the spokes for the same reasons as discussed above for the process of FIGS. 27A–27D.

As an alternative to the above discussed process, spokes 22 may first be attached to hub 18 and unattached to rim 12, prior to deformation; the rim deformed as discussed above; and spokes 22 attached at outside spoke portions 26, under rim deformation, by forcing spokes 22 to rim 12 and releasing.

Accordingly, by deforming rim 12 in the manner shown, or in the alternative manner discussed, and attaching the spokes, upon release of the forces causing the deformation, rim 12 will return to its normal shape at equilibrium and with spokes 22 placed under tension.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A spoked wheel comprising:

an annular rim having an inner diameter;

a central hub;

a plurality of spokes running between the rim and hub, with each spoke having width to thickness ratio of at least 2:1, wherein said spokes have spoke portions including inside spoke portions in fixed relationship to the hub and outside spoke portions in fixed relationship to the rim, and wherein said spokes extend radially outwardly between the hub and rim;

an encircling member affixed to at least one of the inside and outside spoke portions and included with at least one of the annular rim and the central hub, said encircling member defining a hollow annulus;

a fastener for affixing said spokes to said encircling member including two leg members extending in substantially the same direction, wherein said leg members are attached via an intermediate portion substantially traversing said direction and said fastener extending from at least one of said inside spoke portion and said outside spoke portion of at least one of said plurality of spokes and into said hollow annulus, wherein said fastener is attached to said at least one of said plurality of spokes and said leg members are directed toward said encircling member; and means for adjusting the tension of said spokes connected with said spokes.

2. The vehicle wheel according to claim 1, wherein said fastener is substantially U-shaped.

3. The vehicle wheel according to claim 1, wherein said fastener is substantially V-shaped.

4. The vehicle wheel according to claim 1, wherein said fastener is substantially semi-circular in shape.

5. The vehicle wheel according to claim 1, wherein said fastener is substantially semi-oval in shape.

6. The spoked wheel according to claim 1, wherein said fastener affixes said spokes to said encircling member at least at two spaced locations.

7. A spoked wheel comprising:

an annular rim having an inner diameter;

a central hub;

a plurality of spokes running between the rim and hub, with each spoke having width to thickness ratio of at least 2:1, wherein said spokes have spoke portions including inside spoke portions in fixed relationship to the hub and outside spoke portions in fixed relationship to the rim, and wherein said spokes extend radially outwardly between the hub and rim and at least two of said spokes are integrally connected forming a singular member extending substantially across the inner diameter of said rim;

an encircling member affixed to at least one of the inside and outside spoke portions and included with at least one of the annular rim and the central hub, said encircling member defining a hollow annulus;

fastening means adjacent said hollow annulus for affixing said spokes to said encircling member; and means for adjusting the tension of said spokes connected with said spokes.

8. The spoked wheel according to claim 7, wherein said singular member includes an intermediate portion positioned adjacent said hub for connecting said singular member to said hub.

9. The spoked wheel according to claim 7, wherein said singular member includes two ends adjacent said rim, and wherein said fastening means comprises each of said two ends including a fastener for fastening said at least two spokes forming said singular member to said encircling member.

10. The spoked wheel according to claim 9, wherein said fastener is a substantially U-shaped fastener.

11. The spoked wheel according to claim 9, wherein said fastener is a substantially V-shaped fastener.

12. The spoked wheel according to claim 9, wherein said fastener is a substantially semi-circular shaped fastener.

13. The spoked wheel according to claim 9, wherein said fastener is a substantially oval-shaped fastener.

14. The spoked wheel according to claim 9, wherein at least one of said at least two spokes forming said singular member is affixed to said encircling member in at least two spaced locations.

15. The spoked wheel according to claim 9, wherein said outside spoke portion of at least one spoke of said at least two spokes of said singular member includes an enlarged head portion which extends into the hollow annulus and affixes said at least one spoke to the encircling member.

16. The spoked wheel according to claim 9, wherein said encircling member includes a depending flange to which said fastener is adapted to attach at least two spokes of said singular member.

17. The spoked wheel according to claim 9, wherein said outside spoke portion of at least one of said at least two spokes of said singular member includes a cover affixed thereto, said fastener attached to and extending from the cover to the means adjacent the hollow annulus for affixing the at least one spoke to the encircling member, wherein said cover is positioned between said at least one spoke and said encircling member.

18. The spoked wheel according to claim 9, wherein said outside spoke portion of at least one of said at least two spokes of said singular member includes an insert positioned therein, said faster extending from the insert to the means adjacent the hollow annulus for affixing the at least one of said at least two spokes to the encircling member, wherein the insert is positioned between said at least one spoke and said encircling member.

19. The spoked wheel according to claim 9, wherein said annulus includes at least one depending slot adapted to receive and which engages an enlarged head portion of said outside spoke portion of at least one of said at least two spokes of said singular member for affixing said at least one spoke to the encircling member, wherein said slot substantially limits pivoting of said at least one spoke in a direction parallel to said width.

20. The spoked wheel according to claim 7, including two overlapping singular members centrally positioned on said hub at an angle relative to each other on each side of said central hub.

21. The spoked wheel according to claim 7, wherein said fastening means affixes said spokes to said encircling member at least at two spaced locations.

22. A spoked wheel comprising:
an annular rim having an inner diameter;
a central hub;
a plurality of spokes running between the rim and hub, with each spoke having a width to thickness ratio of at least 2:1, wherein said spokes have spoke portions including inside spoke portions in fixed relationship to the hub and outside spoke portions in fixed relationship to the rim, and wherein said spokes extend radially outwardly between the hub and rim wherein said plurality of spokes are arranged to form a first and a second wheel half;
an encircling member affixed to the outside spoke portions and included with the annular rim, said encircling member defining a hollow annulus;
fastening means adjacent said hollow annulus for affixing said spokes to said encircling member; and
means for adjusting the tension of the spokes connected with said spokes.

23. The spoked wheel according to claim 22, wherein said fastening means comprises a substantially U-shaped fastener connected to an end of said outside spoke portion.

24. The spoked wheel according to claim 22, wherein said fastening means comprises a substantially V-shaped fastener connected to an end of said outside spoke portion.

25. The spoked wheel according to claim 22, wherein said fastening means comprises a substantially semi-circular shaped fastener connected to an end of said outside spoke portion.

26. The spoked wheel according to claim 22, wherein said fastening means is a substantially oval-shaped fastener connected to an end of said outside spoke portion.

27. The spoked wheel according to claim 22, wherein said spokes are affixed to said encircling member via said fastening means in at least two spaced locations.

28. The spoked wheel according to claim 22, wherein said fastening means comprise said outside spoke portion of at least one of said spokes having an enlarged head portion which extends into the hollow annulus and affixes said at least one of said spokes to the encircling member.

29. The spoked wheel according to claim 22, wherein said encircling member has a depending flange to which said fastening means is adapted to affix at least one of said spokes.

30. The spoked wheel according to claim 22, wherein said outside spoke portion of at least one of said spokes includes a cover affixed thereto, said fastening means attached to and extending from the cover to said hollow annulus for affixing the at least one spoke to the encircling member, wherein said cover is positioned between said at least one spoke and said encircling member.

31. The spoked wheel according to claim 21, wherein said outside spoke portion of at least one of said spokes includes an insert positioned therein, said fastening means extending from the insert to the hollow annulus for affixing said at least one spoke to the encircling member, wherein the insert is positioned between said at least one spoke and said encircling member.

32. The spoked wheel according to claim 22, wherein said annulus includes at least one depending slot adapted to receive and which engages an enlarged head portion of said outside spoke portion of at least one of said spokes for affixing said at least one of said spokes to the encircling member, wherein said slot substantially limits pivoting of said at least one spoke in a direction parallel to said width.

33. The spoked wheel according to claim 22, wherein said fastening means includes additional means for adjusting the tension of said spokes.

34. The spoked wheel according to claim 22, wherein said means for tensioning comprises a spacer adapted to push said first and second wheel halves apart for tensioning said spokes.

35. The spoked wheel according to claim 22, wherein said fastening means affixes said spokes to said encircling member at least at two spaced locations.

36. A spoked wheel comprising:

an annular rim having an inner diameter;

a central hub;

a plurality of spokes running between the rim and the central hub, with each spoke having width to thickness ratio of at least 2:1, wherein said spokes have spoke portions including inside spoke portions in fixed relationship to the central hub and outside spoke portions in fixed relationship to the rim, and wherein said spokes extend radially outwardly between the central hub and rim;

a primary encircling member included with at least one of the annular rim and the central hub, said primary encircling member defining a hollow annulus;

a secondary encircling member affixed to at least one of said outside spoke portions and said inside spoke portions, wherein said secondary encircling member is engaged with said primary encircling member;

fastening means for affixing said spokes to said secondary encircling member; and means for tensioning the spokes connected with said spokes.

37. The spoked wheel according to claim 36, wherein said secondary encircling member is connected to said outside spoke portions of said spokes.

38. The spoked wheel according to claim 37, wherein said secondary encircling member is substantially external to the hollow annulus and the primary encircling member and integrally connects said spokes at said outside spoke portion.

39. The spoked wheel according to claim 38, wherein said means for tensioning is positioned adjacent said inside spoke portions.

40. The spoked wheel according to claim 36, wherein said secondary encircling member is substantially external to the hollow annulus and the primary encircling member and conforms to said primary encircling member.

41. The spoked wheel according to claim 40, wherein said secondary encircling member is adhered to said primary encircling member.

42. The spoked wheel according to claim 36, wherein said fastening means affixes said spokes to said encircling member at least at two spaced locations.

43. A spoked wheel comprising:

an annular rim having an inner diameter;

a central hub;

a plurality of spokes running between the rim and the central hub, with each spoke having width to thickness ratio of at least 2:1, wherein said spokes have spoke portions including inside spoke portions in fixed relationship to the central hub and outside spoke portions in fixed relationship to the rim, and wherein said spokes extend radially outwardly between the central hub and rim wherein said plurality of spokes are arranged in opposing pairs, said opposing pairs joined together at a joint at said outside spoke portions and including ends extending from said joint which form an engaging surface;

an encircling member affixed to at least one of the annular rim and central hub and included with at least one of the annular rim and the central hub, said encircling member defining a hollow annulus wherein said engaging surface of each of said opposing pairs of spokes engages said encircling member;

fastening means adjacent said hollow annulus for affixing said spokes to said encircling member; and means for adjusting the tension of the spokes connected with said spokes.

44. The spoked wheel according to claim 43, wherein said engaging surface conforms in shape to said encircling member.

45. The spoked wheel according to claim 44, wherein said engaging surface is adhered to said encircling member and said encircling member is an outside encircling member.

46. The spoked wheel according to claim 43, wherein said ends extend angularly from said joint, forming said engaging surface in a V-shape for engaging said encircling member.

47. The spoked wheel according to claim 43, wherein said fastening means affixes said spokes to said encircling member at least at two spaced locations.

48. A spoked wheel comprising:

an annular rim having an inner diameter;

a central hub;

a plurality of spokes running between the rim and hub, with each spoke having width to thickness ratio of at least 2:1, wherein said spokes have spoke portions including inside spoke portions in fixed relationship to the hub and outside spoke portions in fixed relationship to the rim, and wherein said spokes extend radially outwardly between the hub and rim;

an encircling member affixed to at least one of the inside and outside spoke portions and included with at least one of the annular rim and the central hub, said encircling member defining a hollow annulus;

fastening means adjacent said hollow annulus for affixing said spokes to said encircling member; and means for adjusting the tension of said spokes connected with said spokes.

49. The spoked wheel according to claim 48, wherein said fastening means affixes said spokes to said encircling member at least at two spaced locations.

* * * * *